United States Patent
Kim

(10) Patent No.: US 9,369,619 B2
(45) Date of Patent: Jun. 14, 2016

(54) CAMERA MODULE HAVING STRUCTURE TO REDUCE FLARE PHENOMENON

(75) Inventor: Eunmi Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/125,865

(22) PCT Filed: Jun. 25, 2012

(86) PCT No.: PCT/KR2012/004978
§ 371 (c)(1),
(2), (4) Date: Dec. 12, 2013

(87) PCT Pub. No.: WO2013/002521
PCT Pub. Date: Jan. 3, 2013

(65) Prior Publication Data
US 2014/0092298 A1    Apr. 3, 2014

(30) Foreign Application Priority Data

Jun. 29, 2011 (KR) .......................... 10-2011-0064006
Aug. 31, 2011 (KR) .......................... 10-2011-0087677

(51) Int. Cl.
*H04N 5/225* (2006.01)
*G03B 17/02* (2006.01)

(52) U.S. Cl.
CPC .............. *H04N 5/2254* (2013.01); *G03B 17/02* (2013.01); *H04N 5/2251* (2013.01); *H04N 5/2252* (2013.01); *H04N 5/2257* (2013.01)

(58) Field of Classification Search
CPC . H04N 5/2254; H04N 5/2257; G02B 13/001; H01L 27/14618; H04M 1/0264; H04M 348/374

See application file for complete search history.

(56) References Cited

U.S. PATENT DOCUMENTS

| | | | | |
|---|---|---|---|---|
| 2005/0237418 | A1* | 10/2005 | Sakamoto | 348/340 |
| 2008/0124071 | A1* | 5/2008 | Kim | 396/448 |
| 2008/0278621 | A1* | 11/2008 | Cho | G03B 17/12 348/374 |
| 2008/0316623 | A1* | 12/2008 | Aoki | G02B 7/04 359/823 |
| 2009/0079863 | A1* | 3/2009 | Aoki et al. | 348/374 |
| 2009/0146174 | A1* | 6/2009 | Tanaka et al. | 257/99 |
| 2010/0176281 | A1* | 7/2010 | Tomioka et al. | 250/227.2 |
| 2011/0121666 | A1* | 5/2011 | Park et al. | 310/15 |
| 2011/0141338 | A1* | 6/2011 | Lee et al. | 348/342 |
| 2012/0147258 | A1* | 6/2012 | Park | 348/374 |
| 2012/0257075 | A1* | 10/2012 | Kamada | 348/222.1 |
| 2014/0354824 | A1* | 12/2014 | Oh | H04N 5/2257 348/164 |

FOREIGN PATENT DOCUMENTS

| | | | |
|---|---|---|---|
| JP | 7-273301 A | 10/1995 | |
| KR | 10-2010-0043829 A | 4/2010 | |
| KR | 10-0951187 B1 | 4/2010 | |

* cited by examiner

*Primary Examiner* — Shahbaz Nazrul

(74) *Attorney, Agent, or Firm* — Birch, Stewart, Kolasch & Birch, LLP

(57) ABSTRACT

The present invention relates to a camera module, the module including a case embedded with a lens, a base supporting the case and formed with a window for passing an optical image emitted by the lens, the window being formed with a staircase unit, and a PCB (Printed Circuit Board) mounted with the base and an image sensor for converting the optical image to an electrical signal.

8 Claims, 5 Drawing Sheets

CAMERA MODULE HAVING STRUCTURE TO REDUCE FLARE PHENOMENON

TECHNICAL FIELD

The teachings in accordance with exemplary embodiments of this invention relate generally to a camera module.

BACKGROUND ART

Concomitant with widely generalized distribution of various portable terminals and commercialization of wireless Internet services, consumer demands related to the portable terminals are diversified, whereby a variety of peripheral devices come to be mounted on the portable terminals. One of the representative devices is a camera module condenses an image of a subject through an image sensor and stores the image as data on a memory in equipment, wherein the stored data is displayed with a picture through a display medium such as an LCD (Liquid Crystal Display) monitor or a PC (Personal Computer) monitor in the equipment.

Recently, demands are high for a small-sized camera module applicable to a diversity of IT (Information Technology) equipment including a potable mobile communication device such as a notebook type personal computer, a camera phone, a PDA (Personal Digital Assistant), and a smart phone and a toy camera. Furthermore, various technical developments are being waged to improve an image quality of a subject captured by the camera module.

FIG. 1 is a schematic structural view of a camera module according to prior art, and FIG. 2 is a photographic view of an image of a subject captured by a camera module according to prior art.

The camera module according to prior art includes a case (10) embedded with a lens (31), a base (60) supporting the case (10) and formed with a window (65) for passing an optical image emitted by the lens (31), and a PCB (Printed Circuit Board, 90) mounted with the base (60) and an image sensor (80) for converting the optical image to an electrical signal, where reference numeral 70 in FIG. 1 is an infrared filter.

The camera module according to the prior art is disadvantageous in that an inner wall (65) of the window (65) at the base (60) is perpendicularly formed, and an outside light (A) having passed the lens (31) and deviated from a view angle of the lens (31) is reflected from the inner wall of the window (65) to be inputted into the image sensor (80) as shown in FIG. 1, whereby a red pattern is generated on an image of a subject captured by the camera module, as shown in "K" region of FIG. 2.

DISCLOSURE

Technical Problem

The present general inventive concept provides a camera module directed to solve the aforementioned problems or disadvantages by preventing flare phenomenon of red pattern generated on an image of a subject from occurring.

Technical problems to be solved by the present invention are not restricted to the above-mentioned, and any other technical problems not mentioned so far will be clearly appreciated from the following description by skilled in the art. Additional aspects and advantages of the present general inventive concept will be set forth in part in the description which follows and, in part, will be obvious from the description, or may be learned by practice of the general inventive concept.

Technical Solution

According to a general aspect and an exemplary embodiment of the present invention, there is provided a camera module, the camera module comprising: a case embedded with a lens; a base supporting the case and formed with a window for passing an optical image emitted by the lens, the window being formed with a staircase unit; and a PCB (Printed Circuit Board) mounted with the base and an image sensor for converting the optical image to an electrical signal.

Preferably, but not necessarily, the staircase unit is realized by at least one or more lugs on the window.

Preferably, but not necessarily, the staircase unit includes a lateral wall, and a floor surface extended to the lateral wall.

Preferably, but not necessarily, the window of the base is positioned between the lens and the image sensor, and the floor surface of the staircase unit at the window faces the lens.

Preferably, but not necessarily, length of the floor surface is longer than that of the lateral wall.

Preferably, but not necessarily, the base is realized by an injection-molded product.

Preferably, but not necessarily, the base is realized by a ceramic substrate.

In another general aspect and an exemplary embodiment of the present invention, there is provided a camera module, the camera module comprising: a case embedded with a lens; a base supporting the case and formed with a window for passing an optical image emitted by the lens, the window being formed with a lug; and a PCB (Printed Circuit Board) mounted with the base and an image sensor for converting the optical image to an electrical signal.

Preferably, but not necessarily, a height of lateral wall at the lug is higher than that at the window.

Preferably, but not necessarily, at least one or more lugs are formed.

Preferably, but not necessarily, each lug has a same length, in a case two or more lugs are formed.

Preferably, but not necessarily, each lug has a different length, in a case two or more lugs are formed.

Preferably, but not necessarily, each length of the plurality of lugs gradually increases toward a direction of the image sensor.

Preferably, but not necessarily, a length of a lug positioned nearest to the image sensor among the plurality of lugs is the longest.

In still another general aspect and an exemplary embodiment of the present invention, there is provided a camera module, the camera module comprising: a case embedded with a lens; a base supporting the case and formed with a window for passing an optical image emitted by the lens, an inner lateral wall of the window being formed with an inclination; and a PCB (Printed Circuit Board) mounted with the base and an image sensor for converting the optical image to an electrical signal.

Preferably, but not necessarily, the inclined inner lateral wall of the window faces the image sensor.

Preferably, but not necessarily, the window of the base is interposed between the lens and the image sensor, and a diameter of the window area of the base facing the lens is greater than that of window area of the base facing the image sensor.

Preferably, but not necessarily, the lens is formed therein with a lens barrel mounted with the lens, and an actuator including a bobbin coupled to the lens barrel and a coil wound on a periphery of the bobbin.

Preferably, but not necessarily, camera module is further including an upper elastic member mounted to the case and a lower elastic member mounted on the base to allow the lens barrel and the bobbin to return to an original state after being moved to an optical direction in response to activation of the actuator.

Preferably, but not necessarily, the base is realized by a ceramic substrate.

Advantageous Effects

A camera module according to the present invention has an advantageous effect in that a window of a base is formed with a staircase unit to reduce a light amount of outside light deviated from view angle of a lens inputted into an image sensor by being diffusedly reflected from the staircase unit of the window, whereby an image of a subject is prevented from being generated with a flare phenomenon of red colored pattern.

Another advantageous effect is that an inclined surface is formed at an inner lateral wall of a window of a base to allow the inclined surface to face an image sensor, whereby outside light deviated from view angle of a lens is prevented from inputting into the image sensor by being reflected from the inner lateral wall of the window to prevent an image of a subject from being generated with a flare phenomenon of red colored pattern.

DESCRIPTION OF DRAWINGS

The teachings of the present invention can be readily understood by considering the following detailed description in conjunction with the accompanying drawings, in which.

BEST MODE

Figure 1:
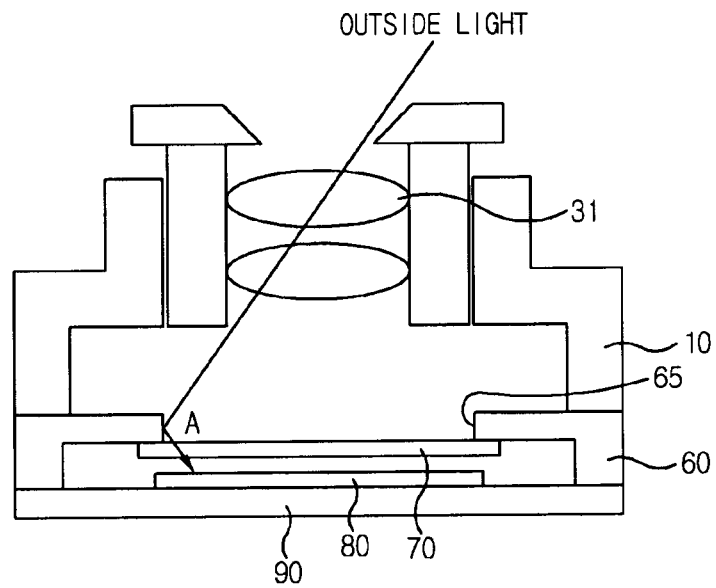
FIG. 1 is a schematic structural view of a camera module according to prior art.
Figure 2:
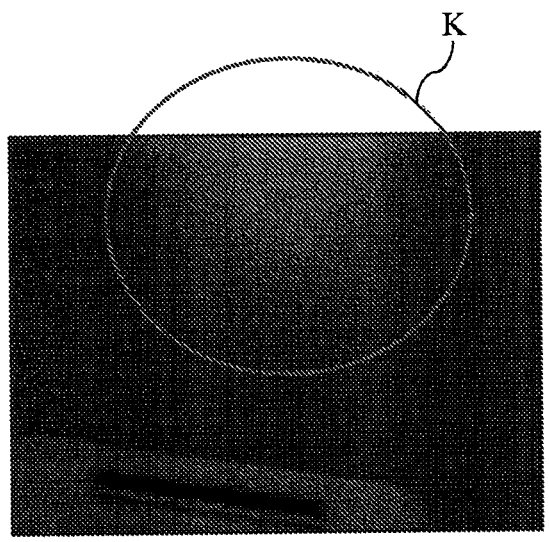
FIG. 2 is a photographic view of an image of a subject captured by a camera module according to prior art.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

Figure 3:
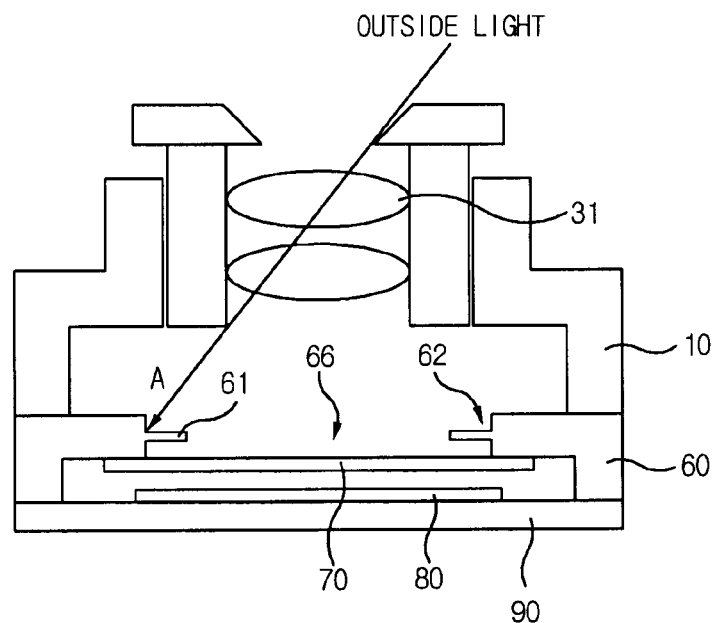
FIG. 3 is a schematic cross-sectional view illustrating a camera module according to an exemplary embodiment of the present invention.

FIG. 3 is a schematic cross-sectional view illustrating a camera module according to an exemplary embodiment of the present invention.

A camera module according to an exemplary embodiment of the present invention includes a case (10) embedded with a lens (31); a base (60) supporting the case (10) and formed with a window (66) for passing an optical image emitted by the lens (31), the window (66) being formed with a staircase unit (62); and a PCB (Printed Circuit Board, 90) mounted with the base (10) and an image sensor (80) for converting the optical image to an electrical signal.

That is, as shown FIG. 3, an outside light (A) deviated from a view angle of the lens (31) scattered (diffusedly reflected) from an inner lateral wall of the window (66) by the staircase unit (62) to reduce amount of light incident on the image sensor (80) or convert a direction of the incident light. That is, the camera module according to an exemplary embodiment of the present invention can reduce the amount of light deviated from the view angle of the lens, scattered from the staircase unit of window and incident on the image sensor by way of forming the staircase unit on the window of the base, whereby flare phenomenon generated with red pattern can be prevented. Furthermore, the staircase unit (62) of the window (66) may be realized by at least one or more lugs formed at the window (66). For information, reference numeral '70' is an infrared filter.

Meanwhile, an exemplary embodiment of the present invention may include a case embedded with a lens, a base supporting the case and formed with a window for passing an optical image emitted by the lens, the window being formed with a lug, and a PCB (Printed Circuit Board) mounted with the base and an image sensor for converting the optical image to an electrical signal.

Figure 4:
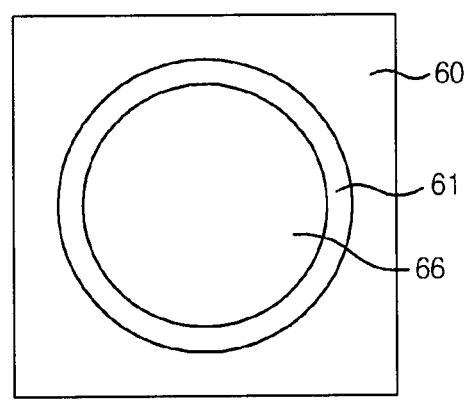
FIG. 4 is a schematic plan view illustrating a base of a camera module according to an exemplary embodiment of the present invention.
Figure 8:
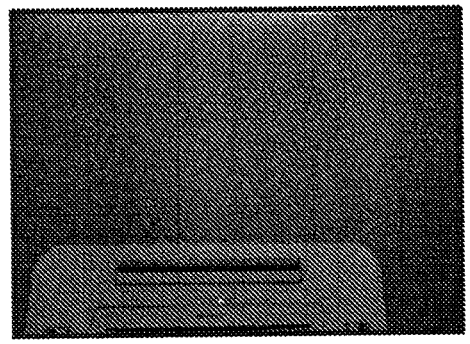
FIG. 8 is a photographic view illustrating an image of a subject captured by a camera module according to an exemplary embodiment of the present invention.

FIG. 4 is a schematic plan view illustrating a base of a camera module according to an exemplary embodiment of the present invention, and FIG. 8 is a photographic view illustrating an image of a subject captured by a camera module according to an exemplary embodiment of the present invention.

As noted from the foregoing, an image of a subject is formed with the staircase unit at the window (66) of the base (60). At this time, the window (66) of the base (60) is interposed between the lens and the image sensor, and an outside light deviated from the view angle of the lens is scattered from a floor surface (62b) of the staircase at the window (66) facing the lens. In other words, the staircase unit is formed at the window (66) of the base (60), whereby an image of a subject free from red pattern can be obtained as shown in FIG. 8 according to an exemplary embodiment of the present invention.

Figure 5:
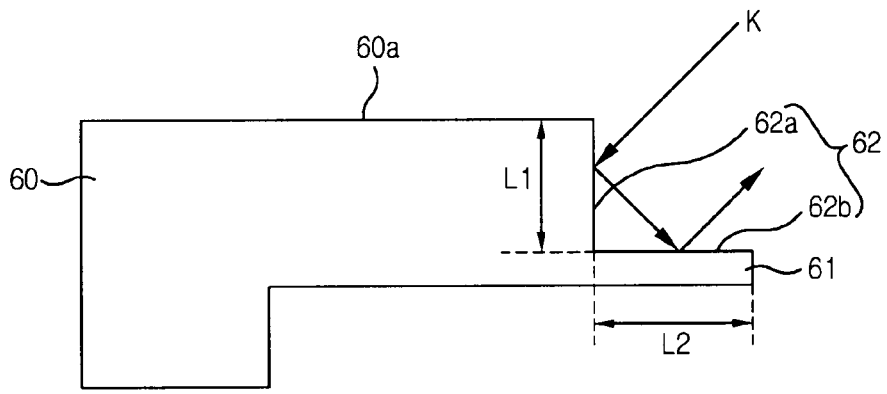
FIG. 5 is a schematic partial view illustrating a staircase unit formed at a window of a base of a camera module according to an exemplary embodiment of the present invention.
Figure 6A:
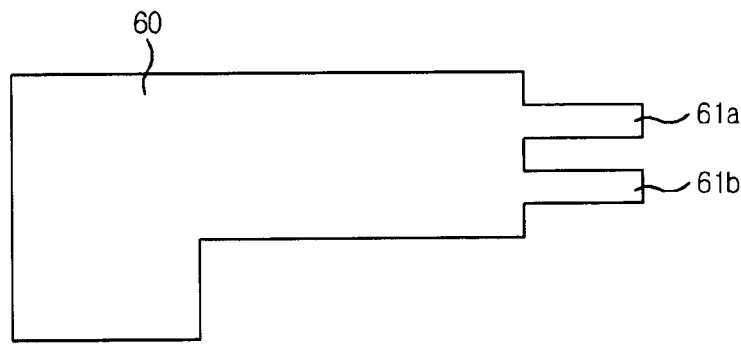
FIGS. 6a and 6b are schematic partial views illustrating a staircase unit formed at a window of a base of a camera module according to another exemplary embodiment of the present invention.
Figure 6B:
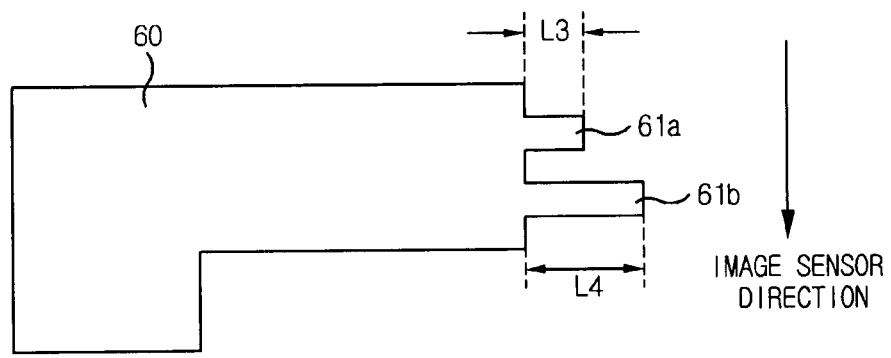
Figure 7:
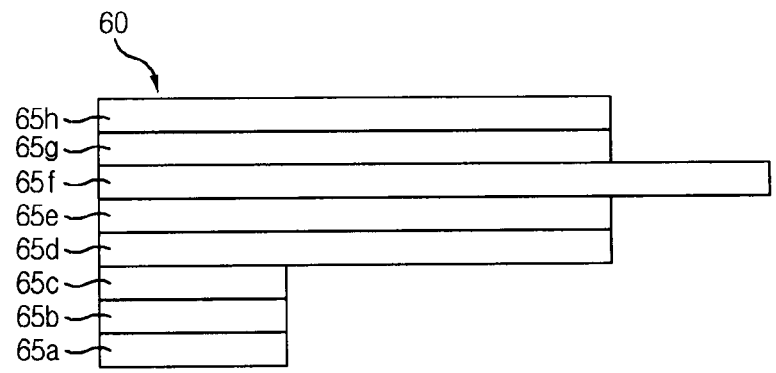
FIG. 7 is a schematic partial view illustrating a method of manufacturing a staircase unit formed at a window of a base of a camera module according to an exemplary embodiment of the present invention.

FIG. 5 is a schematic partial view illustrating a staircase unit formed at a window of a base of a camera module according to an exemplary embodiment of the present invention, FIGS. 6a and 6b are schematic partial views illustrating a staircase unit formed at a window of a base of a camera module according to another exemplary embodiment of the present invention and FIG. 7 is a schematic partial view illustrating a method of manufacturing a staircase unit formed at a window of a base of a camera module according to an exemplary embodiment of the present invention.

Referring to FIG. 5, the staircase unit (62) fondled at the window of the base (60) include a lateral wall (62a) and a floor surface (62b) extended from the lateral wall (62a), where the floor surface (62b) faces the lens to scatter an outside light, and where a length (L2) of the floor surface (62b) is preferably longer than a length (L1) of the lateral wall (62a). That is, in a case the length (L2) of the floor surface (62b) is preferably longer than the length (L1) of the lateral wall (62a), light (K) reflected from the lateral wall (62a) can be fully reflected to more efficiently prevent the outside light deviated from an view angle of the lens from being incident on the image sensor.

Furthermore, the staircase unit (62) in FIG. 5 is formed by a lug (61) protruded from the window. A height of a lateral wall of the lug may be lower than that of the window, whereby the flare phenomenon can be reduced by reducing light reflected from the lateral wall. Furthermore, the staircase (62) of the window (66) may be realized by two lugs (61a, 61b) formed at the window (66). The lugs (61a, 61b) are equidistantly arranged at the inner lateral wall of the window. At this time, a length (L4) of the lug (61b) near to the image sensor among the two lugs (61a, 61b) may be longer than a length (L3) of the lug (61a) near to the lens, whereby an outside light deviated from a view angle of the lens that may be incident on the image sensor can be further blocked by the lug (61b) near to the image sensor.

At this time, in a case at least one or more lugs are formed at the window (66), the length of the lug may be gradually lengthened toward the image sensor. Furthermore, the length of the plurality of lugs may be same or differently formed. Still furthermore, a length of a lug positioned nearest to the image sensor among the plurality of lugs is the longest.

Furthermore, the base (60) of the camera module according to an exemplary embodiment of the present invention may be realized by an injection-molded product. The base (60) of the camera module according to an exemplary embodiment may be realized by a ceramic substrate. That is, the base (60) may be formed by stacking ceramic substrates (65a, 65b, 65c, 65d, 65e, 65f, 65g, 65h). At this time, each of the ceramic substrates (65a, 65b, 65c, 65d, 65e, 65f, 65g, 65h) may take an appropriate form to maintain a shape having a staircase formed at the window of the base (60).

Figure 9:
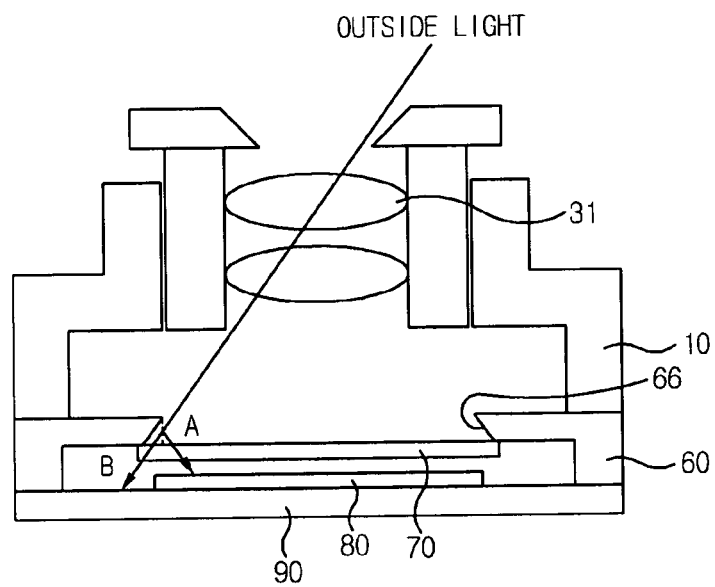
FIG. 9 is schematic structural view illustrating a camera module according to an exemplary embodiment of the present invention.

FIG. 9 is schematic structural view illustrating a camera module according to an exemplary embodiment of the present invention.

The camera module according to an exemplary embodiment of the present invention includes a case (10) embedded with a lens (31), a base (60) supporting the case (10) and formed with a window (66) for passing an optical image emitted by the lens (31), an inner lateral wall of the window (66) being formed with an inclination, and a PCB (Printed Circuit Board, 90) mounted with the base (60) and an image sensor (80) for converting the optical image to an electrical signal.

That is, the inclined inner lateral wall of the window (66) does not face the lens (31) but face the image sensor (80), whereby, as shown in FIG. 9, an outside light (B) deviated from the view angle of the lens (31) is not reflected from the inner lateral wall of the window (66) and is not incident on the image sensor (80), where FIG. 9 illustrates that the outside light (A) is reflected in a comparative example.

As a result, the camera module according to the exemplary embodiment of the present invention is advantageous in that an inner lateral wall of the window at the base is formed with an inclination and the inclination is made to face the image sensor to prevent the outside light deviated from the view angle of the lens from being reflected and inputted to the image sensor, whereby an image of the subject is prevented from generating a flare phenomenon of red pattern.

Figure 10:
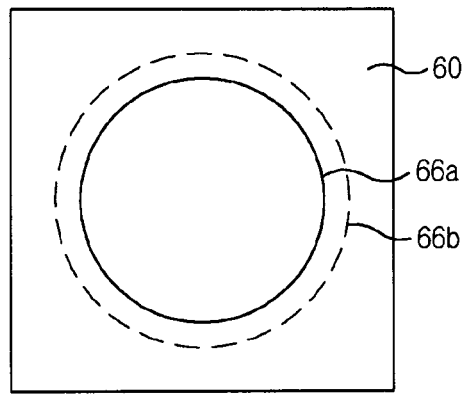
FIG. 10 is a schematic plan view illustrating a base of a camera module according to an exemplary embodiment of the present invention.

FIG. 10 is a schematic plan view illustrating a base of a camera module according to an exemplary embodiment of the present invention.

As mentioned above, the inner lateral wall of the window at the base is formed with the inclination to prevent the image of the subject from generating a flare phenomenon of red pattern. At this time, the window of the base (60) is interposed between the lens and the image sensor, and as shown in FIG. 4, a diameter of the window area (66b) of the base (60) facing the image sensor is greater than that of window area (66a) of the base (60) facing the lens. Furthermore, the inner lateral wall of the window at the base (60) may be defined by a surface formed by being connected to the window area (66b) of the base (60) facing the image sensor from the window area (66a) of the base (60) facing the lens. Thus, the inner lateral wall of the window at the base (60) may not face the lens but face the image sensor, whereby an image of a subject free from the red pattern can be obtained by the camera module as illustrated in FIG. 5 according to the exemplary embodiment of the present invention.

Mode for Invention

Figure 11:
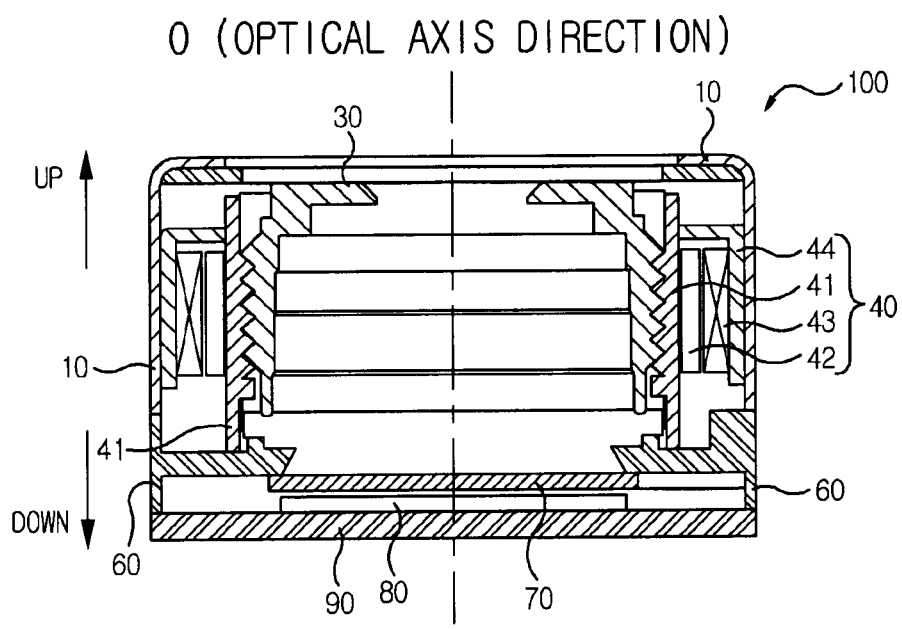
FIG. 11 is a schematic cross-sectional view illustrating a camera module according to an exemplary embodiment of the present invention.

FIG. 11 is a schematic cross-sectional view illustrating a camera module according to an exemplary embodiment of the present invention.

Referring to FIG. 11, a camera module (100) according to an exemplary embodiment of the present invention includes parts including a case (10), a lens barrel (30), an actuator (40), a base (60), an IR (infrared) filter (70), an image sensor (80) and a PCB (Printed Circuit Board, 90). The actuator (40), a moving part moving the lens barrel (30) along an optical axis (0) for auto focusing is needed, where a voice coil motor may be employed for the actuator (40). The actuator (40) may include a bobbin (41), a coil (42), a permanent magnet (43) and a yoke (44).

Meanwhile, the bobbin (41) takes a bottom and upper-opened cylindrical shape and is formed at an inner circumferential surface with a screw thread corresponding to that of the lens barrel (30). The lens barrel (30) is threaded to the inner circumferential surface of the bobbin (41) to adjust a distant focusing of the camera module.

A coil (42) interacting with the permanent magnet (43) is wound on a periphery of the bobbin (41) to a direction perpendicular to a magnetic flux. An inner side of the case (10) is inserted by the yoke (44) for preventing a magnetic field formed between the coil (42) and the permanent magnet (43) from being leaked to an outside. One of the permanent magnets (43) is mounted at an inner side of the yoke (44) to face the other permanent magnet (43) based on the bobbin (41). The yoke (44) is supported by the base (60).

In a case a voltage is applied to the coil (42), a current flowing on the coil and the magnetic field of the permanent magnet (43) are interacted (Fleming's left hand rule) to allow the bobbin (41) to receive a force to an upper side of the permanent magnet (43). At this time, the greater the intensity of current applied to the coil (42) is, the longer the distance of the lens barrel (30) and the bobbin (41) moving upwards along a direction of an optical axis is.

Furthermore, the camera module (100) according to an exemplary embodiment of the present invention may include an upper elastic member mounted on the case (10) and a lower elastic member mounted on the base (60) to allow the lens barrel (30) and the bobbin (41) to return to an original state after being moved along the optical axis.

A lug of the bobbin (41) is brought into contact with the upper and lower elastic members, where an additional part may be interposed between the upper elastic member and the case (10). Thus, in a case the coil (42) is applied with a voltage, the lens barrel (30) and the bobbin (41) are moved downwards along a direction of the optical axis by elasticity of the upper and lower elastic members to return to the original state.

The case (10) takes a bottom-opened hexahedronical shape and is formed at an upper center with a light passing hole. The case (10) is supported thereunder by the case (10).

The case (10) is coupled to the base (60) to form a space, where the space includes therein with the upper elastic member, the lens barrel (30), the actuator (40) and the IR filter (70). The case (10) is preferably manufactured with plastic for insulation of inside from outside, and may be manufactured by an injection molded product for mass production.

The upper elastic member of a leaf spring is inserted into an upper side of the case (10), an external side of the upper elastic member is supported by the yoke (44) of the actuator (40), and an internal side of the upper elastic member is brought into contact with the bobbin (41) of the actuator (40) to apply a pressure to an upper side of the bobbin (41).

The lower elastic member of a leaf spring is positioned underneath the actuator (40) to apply a pressure to a bottom side of the bobbin (41). The lower elastic member may be insert molded from the bobbin (41), or attached using a bond.

The lens barrel (30) is a means fixing and protecting a plurality of lenses, and sequentially stacked thereinside along the optical axis (0) with the plurality of lenses capable of receiving an optical image of a subject. The PCB (90) is mounted with the image sensor (80) converting an optical image to an electrical signal. The base (60) takes a shape of "☐" having an opening for passing an optical image to the image sensor (80). The base (60) is positioned underneath the lens barrel (30) and mounted with the IR filter (70) filtering infrared.

The image sensor (80) is positioned at a bottom surface of the lens barrel (30) and an upper surface of the PCB (90) to convert an optical image inputted from the plurality of lenses to an electrical signal. The PCB (90) is a FPCB (Flexible PCB) having a good flatness, and a portion of the FPCB extended to an outside is formed with a means (not shown) connected to an outside device.

As noted from the foregoing, the lens barrel (30) according to an exemplary embodiment of the present invention is supported by the upper and lower elastic members.

Furthermore, the camera module according to an exemplary embodiment of the present invention is not limited to the configuration in FIG. 11, but may include camera modules of various other configurations.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that an inclined surface is formed at an inner lateral wall of a window of a base to allow the inclined surface to face an image sensor, whereby outside light deviated from view angle of a lens is prevented from inputting into the image sensor by being reflected from the inner lateral wall of the window to prevent an image of a subject from being generated with a flare phenomenon of red colored pattern.

The invention claimed is:
1. A camera module, the camera module comprising:
a case;
a lens disposed in the case;
a base supporting the case and formed with a window;
a PCB (Printed Circuit Board) coupled to the base; and
an image sensor disposed on the PCB below the window,
wherein the window of the base has a plurality of lugs protruded from an inner lateral wall thereof,
wherein the lugs are equidistantly arranged at the inner lateral wall of the window, and
wherein each lug includes a lateral wall and an upper wan to reflect au outside light deviated from a view angle of the lens and to inhibit the outside light from being incident to the image sensor.
2. The camera module of claim 1, wherein a height of the lateral wall of the lug is lower than that of the window.
3. The camera module of claim 1, wherein each lug has a same length.
4. The camera module of claim 1, wherein each lug has a different length.

5. The camera module of claim 4, wherein length of each of the plurality of lugs gradually increases toward a direction of the image sensor.

6. The camera module of claim 4, wherein a length of a lug positioned nearest to the image sensor among the plurality of lugs is the longest.

7. The camera module of claim 1, wherein the base is formed by an injection-molded product.

8. The camera module of claim 1, wherein the base is formed by a ceramic substrate.

* * * * *